Nov. 22, 1960 G. T. McCLURE ET AL 2,961,274
FLUID PRESSURE BRAKE APPARATUS WITH PERIODIC
ACKNOWLEDGEMENT TYPE SAFETY CONTROL
Filed June 15, 1959

INVENTOR.
GLENN T. McCLURE
THOMAS F. HURSEN
BY
Henry E Otto Jr
ATTORNEY

United States Patent Office 2,961,274
Patented Nov. 22, 1960

2,961,274

FLUID PRESSURE BRAKE APPARATUS WITH PERIODIC ACKNOWLEDGEMENT TYPE SAFETY CONTROL

Glenn T. McClure, McKeesport, and Thomas F. Hursen, Monroeville, Pa., assignors to Westinghouse Air Brake Company, Wilmerding, Pa., a corporation of Pennsylvania Filed June 15, 1959, Ser. No. 820,263

8 Claims. (Cl. 303—19)

This invention relates to control systems requiring periodic actuation by an operator to demonstrate his alertness and prevent the occurrence of a control operation which will otherwise be effected automatically by such system; the invention relating more particularly to fluid pressure brake apparatus embodying such a system and requiring periodic actuation in order to prevent an automatic safety control application of fluid pressure brakes such as on a train.

Many railway locomotives are provided with brake apparatus comprising a "dead man" or safety control valve device operative to initiate a safety control application of automatic fluid pressure brakes, unless a manually or foot-controlled lever is depressed by the engineman at all times except under certain conditions, such as during a manually effected brake application. If the engineman places a tool box or other heavy object on the lever or if he should become ill and slump in such a way as to maintain the lever depressed, the safety control feature will be rendered completely inoperative. In order to prevent such nullification of this safety control feature, it has heretofore been proposed to include in railway fluid pressure brake apparatus rather costly and/or complex control systems requiring periodic actuation or acknowledgment by the engineman in order to prevent a safety control brake application.

The principal object of this invention is to provide an improved, less expensive and relatively simple control system requiring periodic actuation by the operator in order to prevent the occurrence of a certain condition, such as an automatic safety control application of fluid pressure brakes on a railway train.

According to this object, there is provided a control system embodying mechanism responsive to a predetermined degree of reduction in pressure of fluid in a normally charged control pipe to effect a preselected control operation, such as an automatic safety control application of fluid pressure brakes on a train. A lever is biased to a normal position and periodically actuated to an abnormal position such as through contact with an effective portion of a cam element rotated at constant speed. This lever operatively, such as by controlling an electrical circuit, controls operation of a valve so that the latter will establish or disestablish a restricted connection between one branch of the control pipe and atmosphere according to whether said lever means is in abnormal position or normal position, respectively. Promptly after the operator is suitably warned that such restricted connection has been established, he must successively actuate an acknowledging valve to one position to connect another branch of the control pipe to a chamber to charge the latter to above a preselected pressure, and then to another position to disconnect said other branch from said chamber in order to prevent continuous blowdown of control pipe pressure because said chamber is constantly open to atmosphere via a restricted bleed. A locking device will be spring actuated to lock the lever means in abnormal position after the latter moves there, unless the chamber is charged in such manner to above said preselected pressure. Thus the preselected control operation will inevitably occur if the operator, due to illness or inattentiveness, permits the acknowledging valve to stay in its said one position for a predetermined period of time or fails to actuate said valve sequentially to its one and then its other position within said period after the warning is given.

Other objects and advantages will become apparent from the following more detailed description of the invention, and from the accompanying drawing wherein the single figure is a diagrammatic view of a control system embodying the invention shown associated with components of a railway locomotive brake apparatus so as to require periodic actuation by an operator in order to prevent an automatic safety control application of fluid pressure brakes on a train.

*Description*

As shown in the drawing, the control system embodying the invention comprises a normally charged control passage and pipe 1, an operator's acknowledging valve device 2 and a magnet valve device 3 connected to branches of said control pipe, a locking device 4, a cam element 5 rotatable in one direction at a constant speed, and a lever 6 providing an operating connection between the cam element 5, magnet valve device 3 and locking device 4.

Acknowledging valve device 2 may, for sake of illustration, comprise a pedal 7 hingedly mounted on a transverse pin 8 carried by a sectionalized casing 9 and normally biased by a helical spring 10 to an elevated position defined such as by contact of the circular wall of an oversize bore 11 with one side of a small transverse pin 12 carried by the casing and extending through said bore. With pedal 7 in elevated position, a valve 13, preferably in the form of a flexible diaphragm clamped about its outer edge between sections of the casing, will by virtue of its inherent resiliency (or, if preferred, by pressure of a bias spring, not shown) be unseated from a coaxially arranged annular valve seat 14 carried by the casing and encircling a bore open to a branch of control pipe 1. With valve 13 unseated, pipe 1 will be connected to an annular chamber 15 surrounding valve seat 14 and open to a pipe 16. When pedal 7 is depressed, it acts through a pusher stem 17 to operatively hold valve 13 seated for cutting off control pipe 1 from pipe 16. The acknowledging valve device may, if preferred, be of any other type comprising a valve preferably spring biased to one position for connecting pipes 1, 16 and operable to another position for disconnecting said pipes.

Magnet valve device 3 comprises a valve 18 operatively held seated by a plunger 19 responsively to energization of a magnet 20, for cutting off a branch of control pipe 1 from a chamber 21. Upon deenergization of magnet 20, valve 18 will be operatively unseated by a helical spring 22 which is disposed in chamber 21 and acts on said valve via a fluted valve stem 23.

Locking device 4 may comprise a movable abutment, such as a diaphragm piston 24, reciprocably mounted within a sectionalized casing and subject opposingly to pressure of fluid in a chamber 25 and to pressure of a helical bias spring 26 in an atmospheric chamber 27. Coaxially connected to the piston 24 is a piston rod 28 which extends through chamber 25 and intermediate its ends has sealing slidably guided contact with the wall of an aligned casing bore through the end wall of chamber 25 and projects exteriorly of said bore and casing. A roller 29 positively connected to the outer end of piston rod 28 is normally pressed by the action of spring 26 into abutting contact with the end of one arm 30 of lever 6 when said lever is substantially coaxially aligned with said piston rod.

Lever 6, intermediate its arm 30 and another arm 31, is rockably carried by a transverse pin 32 which is supported on a fixed element, such as a lug depending from the casing of device 4. Suitably mounted on lever arm 30, such as by spring clips, is a mercury switch 33. When this switch is in a substantially horizontal position, as shown, the mercury in the switch is adapted to connect two terminals for closing an electrical circuit and thus energizing magnet 20 of device 3 from a suitable source of electrical energy, such as a battery 34.

Cam element 5 preferably is in the form of a wheel comprising a concentrically arranged cylindrical surface 35 joined to a lobe 36 that projects outwardly from said surface and subtends only a very small arcuate angle of the cam element. A helical spring 37 acts on lever arm 31 for normally biasing a roller follower 38 carried by said lever arm into rollable contact with the surface 35 or lobe 36, as the case may be, of cam element 5. Element 5 is rotated in one direction (clockwise, as viewed in the drawing) at a constant speed by a shaft 39 that, in turn, is rotated via reduction gears 40, 41, if necessary, by a constant speed electric motor 42.

As already stated, the control system embodying the invention has been shown, for purposes of illustration, associated with a railway locomotive brake equipment.

This brake equipment comprises an engineer's automatic brake valve device 43 which may, for sake of illustration, be of the type designated as a "DSE–24–H Brake Valve" fully shown in drawing C–72550–64 of, and described in, Instruction Leaflet No. 2606–1 dated February 1950, published by Westinghouse Air Brake Company and covering a so-called "24–RL Locomotive Brake Equipment." This brake valve device comprises, briefly, a casing containing a rotary valve 43a and its fixed seat 43b (not shown in detail), said rotary valve being operable by arcuate movement of a handle 44 to various positions to control pressure of fluid in a brake pipe 45 that extends from the locomotive and from car to car through the train. When handle 44 is moved to a running position, rotary valve 43a establishes a communication whereby pressure fluid is supplied from a main reservoir 46 via a reducing valve device 47 (referred to in the railway brake art as a "feed valve device") to the brake pipe 45 for charging the latter to a desired normal charge value and thereby, in the well-known manner, causing a release of brakes on the locomotive and cars. Control pipe 1 is always connected to the main reservoir 46 via a restriction, shown for simplification as a choke 48, although such restriction preferably is provided in a service application portion 49 of device 43, which portion also comprises valve means (not shown) biased, when the control pipe 1 is fully charged, to a normal position in which among other things it cuts off a branch 1a of control passage 1 from a so-called lock-over port 1b that is connected to atmosphere by the rotary valve 43a in all positions of the brake valve handle 44 except a lap position. When, however, pressure in control pipe 1 is reduced to below a predetermined pressure, the valve means of service application portion 49 will be actuated to an application position in which branch 1a of control passage 1 is connected to lock-over port 1b, rotary valve 43a is cut off from the brake pipe 45, and a service reduction in brake pipe pressure will be effected in by-pass of the rotary valve and cause an automatic safety control application of brakes. When the control system is associated with such locomotive brake apparatus, energization of motor 42 is effected automatically, when the operator performs some other act necessary to condition the locomotive for service; such energization may, for example, be effected by an electrical switch (not shown) controlling two parallel electrical circuits (one the motor circuit, and the other the power circuit for the traction motors of the diesel-electric locomotive) such that in order to energize the power circuit, the motor 42 must also be energized.

It will be understood, however, that the control system may be employed with other types of equipment embodying mechanism rendered ineffective or effective to cause a predetermined control operation according to whether the control pipe 1 is maintained charged or is vented, respectively, in which case motor 42 is arranged to be energized automatically by the performance of some necessary act and cannot be independently deenergized by the operator.

Operation

Assume initially that the main reservoir 46 is charged from the compressors (not shown) on the locomotive; that brake valve handle 44 is in running position; that the control pipe 1 is fully charged from said main reservoir via choke 48, and that the service application portion 49 of device 43 is therefore in its normal position, just defined; that the motor 42 is operating for operatively driving the cam element 5 at constant speed; that roller 29 of device 4 abuts the end of lever arm 30, and roller 38 is riding on cam surface 35, for thereby causing switch 33 to energize magnet 20 of device 3; and that pedal 7 of device 2 is depressed for closing valve 13.

Under the assumed conditions, all components except device 2 will be in the respective positions in which they are shown in the drawing. Hence, pressure fluid supplied to control pipe 1 from the main reservoir 46 will flow from said control pipe via and at the rate controlled by a choke 50 to a timing volume 51 for charging the latter; chamber 25 will be vented via a vent choke 52 T-connected to a pipe 53; and valve 18 of device 3 will be seated for cutting off a branch of control pipe 1 from chamber 21. Chamber 21 is open to atmosphere via a choke 54 and a pipe 55, one branch of which pipe is connected to atmosphere via a vent choke 56 of less capacity than choke 54 and the other branch of which leads to a pneumatically actuated whistle 57.

When cam element 5 rotates clockwise, as viewed in the drawing, far enough to cause roller 38 to ride up on cam lobe 36, lever 6 will be rocked clockwise about pin 32; whereupon spring 26 of device 4 will operatively shift roller 29 leftward along upper surface 58 of lever arm 30 and wedgingly lock lever 6 in an inclined position, in which mercury switch 33 is tilted so as to deenergize magnet 20 of device 3 by breaking the electrical circuit therefor. Lever 6 will be held locked in this inclined position after cam lobe 36 passes roller 38 unless a two-step acknowledging operation is performed in the manner presently to be described.

Meanwhile, with magnet 20 deenergized, valve 18 will be operatively unseated by spring 22 and permit pressure fluid from the control pipe 1 to flow past said valve and along fluted stem 23 to chamber 21 and thence at a restricted rate via choke 54 to pipe 55, whence it will flow to atmosphere via the very restricted vent choke 56 and also via the pneumatic whistle 57. The consequent sounding of whistle 57 warns the operator that an automatic safety control application of brakes will be initiated within a short period of time, such as about 8 seconds, if he fails to perform the prescribed two-step acknowledging operation; it being noted that pressure fluid will flow from timing volume 51 at a substantially unrestricted rate via a check valve 59 to control pipe 1 in by-pass of choke 50 for maintaining control pipe pressure high enough, despite blow-down via choke 56 and whistle 57, to hold off such brake application within said period.

To prevent initiation of the safety control application of brakes after sounding of whistle 57, the operator should promptly release his foot from pedal 7 of the acknowledging valve device 2 for permitting spring 10 to bias said pedal to its elevated position in which valve 13 is effectively unseated. Some of the pressure fluid supplied from timing volume 51 to control pipe 1 will then flow past valve 13, and in by-pass of device 3, to pipe 16, whence it will flow via a check valve 60 to pipe 53 and chamber 25 of locking device 4. The pressure of fluid thus supplied to chamber 25 will be sufficient to shift piston 24 against spring 26 for thereby operatively retracting roller 29 out of contact with lever 6. This will enable spring 37 to rock lever 6 counterclockwise about pin 32 and thus carry roller 38 into contact with cam surface 35 as soon as cam lobe 36 is carried rightward past the point of contact of such roller. When roller 38 thus reengages cylindrical cam surface 35, the mercury switch 33 will be returned to its normal substantially horizontal position, in which it is shown, for reenergizing the magnet 20 and thus cutting off the blowdown of control pipe pressure fluid via choke 56 and whistle 57, and thus stop the sounding of said whistle.

Meanwhile, however, a branch of pipe 16 is connected via a relatively large capacity choke 61 to a pipe 62 having one branch open via a smaller capacity vent choke 63 to atmosphere and another branch connected to a pneumatic whistle 64, which will blow whenever pedal 7 is not maintained depressed. Hence, even after valve 18 recloses responsively to reenergization of magnet 20, pressure fluid will continue to blow down from control pipe 1 via chokes 61, 52 so long as pedal 7 remains in elevated position in which valve 13 is opened. The operator should therefore promptly redepress pedal 7 a few seconds after removing his foot therefrom in order to complete his acknowledging operation and terminate such blowdown of control pipe pressure via chokes 61, 52. When both whistles 57, 64 stop blowing, the operator will know that the two-step acknowledging operation has been satisfactorily performed.

It is to be noted that choke 52 is provided to prevent pressure fluid from being trapped in chamber 52 and thus nullifying the locking function of device 4; said choke and the effective area of piston 24 and force of spring 26 being so selected that pressure in said chamber will not blow down sufficiently to permit spring 26 to effect engagement of roller 29 with the lever 6 until after said lever has been returned to normal position by spring 37, so as to assure that roller 29 will engage the end of lever arm 30 and not relock the lever in inclined position. The chokes 61, 63 and whistle 64 are provided so that if the operator's foot is removed from pedal 7 for more than the aforementioned period, a safety control application of brakes will be initiated even if lever 6 happens to be in its normal position. This arrangement is desirable so that if the operator should become ill and remove his foot from pedal 7 just after he has performed the two-step acknowledging operation, the safety control application of brakes can be initiated more promptly and will not be dangerously deferred until after the operator fails to respond to tilting of lever 6 by cam lobe 36; it being contemplated that cam element 5 will be rotated at such speed as to bring cam lobe 36 into contact with roller 38 only once in say a two-minute period, so as not to impose too great an acknowledging burden on the operator. Moreover, the timing volume 51 is of such preselected capacity in relation to the capacity of chokes 54, 61 as to provide a desired overall "hold off" period of the safety control application of brakes of the illustrative eight seconds, during which the two-step acknowledging operation can be reasonably completed.

It will now be understood that a desired control operation, such as an automatic safety control application of brakes, may be initiated by permitting control pipe pressure to be reduced in either of two ways; first, by failing to perform the two-step acknowledging operation (taking one's foot off of pedal 7 and then redepressing said pedal) within a predetermined period when whistle 57 sounds periodically in response to tilting of lever 6 by cam lobe 36; and, second, by removing one's foot from pedal 7 for more than said predetermined period while lever 6 is in its normal substantially horizontal position. Thus, the pedal 7 should normally be maintained depressed except when performing the two-step acknowledging operation.

Assume now that control pipe pressure blows down to below the aforementioned predetermined pressure in either of the two ways just summarized, and that brake valve handle 44 is in running position. The service application portion 49 of device 44 will respond to such reduction in control pipe pressure, in the manner already described, to effect a service rate of reduction in pressure in the brake pipe 45 and thereby initiate an automatic safety control application of brakes on the locomotive and cars; and a branch 1a of control passage 1 will be uncovered to lock-over port 1b which, with handle 44 in running position, is connected to atmosphere, the latter connection being provided to penalize the operator by independently venting the control passage and pipe 1 so that said brake application will occur even if the operator belatedly completes the two-step acknowledging operation or redepresses pedal 7.

To recapture control of the train after the brake application has been effected, the operator must, in accordance with the usual practice, move brake valve handle 44 to lap position which, as earlier stated, is the only position of said handle in which the rotary valve 43a cuts off the lock-over port 1b from atmosphere; whereupon fluid under pressure may be effectively supplied from main reservoir 46 via choke 48 to the control pipe and passage 1 and thus effect return of the service application portion 49 to normal position, in which (among other things not pertinent to the invention) branch 1a of control passage 1 is cut off from the lock-over port 1b and brake pipe pressure is once again placed under control of the rotary valve 43a according to selected position of said handle. Handle 44 may thereafter be moved to running position for effectively recharging the brake pipe 45 so as to release such brake application.

Having now described the invention, what we claim as new and desire to secure by Letters Patent, is:

1. In combination, a normally charged control pipe, mechanism responsive to predetermined degree of reduction in fluid pressure in the control pipe to effect a preselected control operation, lever means biased to a normal position, means operative repeatedly at the expiration of each substantially uniform successive interval of time for actuating the lever means to an abnormal position if not already there, valve means operatively connected to the lever means and responsive to actuation of said lever means to abnormal position to establish a restricted connection between one branch of the control pipe and the atmosphere and operative to disestablish said connection when said lever means is in normal position, locking means subject opposingly to a spring bias pressure and to pressure of fluid in a chamber connected to the atmosphere via another restriction, said locking means being operative upon actuation of said lever means to abnormal position to lock said lever means in abnormal position unless said chamber is charged to above a preselected pressure, and an operator-controlled acknowledging valve for selectively connecting or disconnecting another branch of the control pipe to said chamber, whereby the operator must demonstrate his alertness by maintaining said acknowledging valve in disconnect position except when the lever means is actuated to abnormal position, whereupon he must successively actuate said valve to connect position and then disconnect position, in order to prevent the mechanism from automatically effecting the preselected control operation.

2. The combination according to claim 1, including another pipe via which said chamber is charged from said valve, a check valve permitting fluid flow only from said other pipe to said chamber, warning means operatively connected to said valve means for warning the operator whenever said restricted connection is established by said valve means, and warning means operatively connected to said valve for warning the operator whenever said valve is in its connect position.

3. The combination according to claim 1, including a timing volume, and a check valve and choke arranged between a branch of the control pipe and said timing volume to permit charging of said timing volume at a restricted rate via said choke from the control pipe and permit flow from said timing volume to the control pipe past said check valve at a substantially unrestricted rate around said choke, said timing volume serving to store sufficient pressure fluid to delay said predetermined degree of reduction in control pipe pressure for a desired period of time.

4. A control system requiring periodic actuation by an operator to prevent the occurrence of a preselected control operation, said system comprising a source of pressure fluid, a control pipe charged at a restricted rate from the source so as normally to contain fluid at a high value of pressure, mechanism responsive to a reduction in control pipe pressure to a preselected lower value to effect the control operation, electrically controlled valve means normally conditioned to cut off one branch of the control pipe from one restricted bleed, warning means operatively connected to said valve means for warning the operator when the control pipe is connected to said one bleed, an electrical circuit for said valve means, lever means controlling energization and deenergization of said circuit and biased to a normal position for operatively effecting said normal conditioning of said valve means, cam means rotated at a substantially constant speed and having a portion which periodically engages said lever means to actuate the latter to an abnormal position in which it causes said valve means to be conditioned to connect said control pipe to said one bleed, locking means subject opposingly to a spring bias pressure and to pressure of fluid in a chamber connected to another restricted bleed, said locking means being operative upon actuation of said lever means to its abnormal position to lock said lever means in abnormal position unless said chamber is charged to above a preselected pressure, and a valve biased to one position for connecting another branch of said control pipe to said chamber and operable by an operator to another position for disconnecting said other branch from said chamber, whereby said valve must normally be maintained in its said other position to prevent continuous blowdown of control pipe pressure via said other bleed and must promptly after such warning is given be actuated successively to its one position to charge said chamber above said preselected pressure and then to its other position for causing said locking means to effectively unlock said lever means and permit the latter's return to normal position as soon as said cam portion is rotated out of engagement with said lever means.

5. In a fluid pressure brake apparatus, the combination with a control pipe normally charged to a high pressure from a source of pressure fluid via a restriction, a normally charged brake pipe, and means automatically responsive to a reduction in control pipe pressure to a preselected lower pressure to effect a reduction in brake pipe pressure for causing an automatic safety control application of brakes, of lever means biased to a normal position, cam means rotated at a substantially constant speed and having an effective portion which periodically engages said lever means for actuating the latter to an abnormal position, valve means operatively connected to said lever means and responsive to actuation of said lever means to abnormal position to establish a restricted connection between one branch of the control pipe and the atmosphere and operative to disestablish said connection when said lever means is in normal position, warning means operatively connected to said valve means for warning the operator whenever said connection is established, locking means subject opposingly to a spring bias pressure and to pressure of fluid in a chamber connected to the atmosphere via another restriction, said locking means being operative upon actuation of said lever means to abnormal position to lock said lever means in abnormal position unless said chamber is charged to above a preselected pressure, and an operator-controlled valve biased to one position for permitting flow of pressure fluid from another branch of the control pipe to said chamber and operable to another position for preventing such flow, whereby said operator-controlled valve must normally be maintained in its said other position to prevent continuous blowdown of control pipe pressure via said other restriction and must promptly after such warning is given be operated successively to its said one position for temporarily charging said chamber to above said preselected pressure and then operated to said other position to prevent continued depletion of control pipe pressure via said other restriction, pressure fluid thus supplied to said chamber serving to actuate said locking means out of locking contact with said lever means to permit return of the latter to its normal position as soon as said effective cam portion is rotated out of engagement with said lever means, and said other restriction being sufficiently restricted to prevent blowdown of chamber pressure to below said preselected pressure until after said lever means returns to its normal position.

6. The combination according to claim 5, wherein said valve means is controlled by an electrical circuit that is energized by said lever means when in normal position for causing said valve means to establish said restricted connection and is deenergized by said lever means when in abnormal position for causing said valve means to disestablish said restricted connection.

7. The combination according to claim 5, including a timing volume, a check valve and choke arranged to permit pressure fluid to flow from the control pipe via said choke to the timing volume at a restricted rate and from the latter at a substantially unrestricted rate past said check valve to the control pipe for decreasing the rate of reduction in control pipe pressure, another check valve interposed between said valve and chamber for permitting flow of pressure fluid via said valve to said chamber and preventing flow in the reverse direction, another warning means operatively connected to said valve for warning the operator whenever said valve is in said one position, both of said warning means being pneumatically actuated by pressure fluid supplied respectively to said other check valve and said restricted connection.

8. The combination, with mechanism responsive to a reduction in pressure of fluid in a normally charged control conduit to effect a preselected control operation, of: lever means, means urging said lever means to a normal position, means automatically operative periodically to actuate said lever means to an abnormal position, valve means having two positions in which it respectively establishes and disestablishes a restricted connection between one branch of the control conduit and a vent, means providing an operative connection between said valve means and lever means to cause said valve means to be actuated to its connection-disestablishing position or connection-establishing position according to whether said lever means is in normal position or abnormal position respectively, locking means biased into operative contact with said lever means for locking said lever means in abnormal position upon its being actuated thereto, fluid pressure responsive means subject to pressure of fluid in a chamber open to a vent via a restriction and operatively connected to said lever means for withdrawing said locking means from locking engagement with said lever means upon charging of said chamber to above a preselected pressure, and an operator-controlled valve to selectively connect or disconnect another branch of the control conduit to said chamber, whereby the operator must demonstrate his alertness by maintaining said operator controlled valve in disconnect position except when the lever means is actuated to abnormal position, whereupon he must successively actuate said valve to connect position and then disconnect position to prevent a reduction in pressure in the control conduit sufficient to cause the mechanism to automatically effect the preselected control operation.

References Cited in the file of this patent

UNITED STATES PATENTS

| | | |
|---|---|---|
| 1,687,107 | Ruegg | Oct. 9, 1928 |
| 2,074,752 | Logan | Mar. 23, 1937 |
| 2,243,068 | Blue et al. | May 27, 1941 |
| 2,263,330 | Farmer | Nov. 18, 1941 |
| 2,785,931 | Gorman | Mar. 19, 1957 |
| 2,820,677 | Jados | Jan. 21, 1958 |